United States Patent
Darbha et al.

(10) Patent No.: US 8,802,876 B2
(45) Date of Patent: Aug. 12, 2014

(54) PROCESS FOR PRODUCING FATTY ACIDS

(75) Inventors: Srinivas Darbha, Maharashtra (IN); Jitendra Kumar Satyarthi, Maharashtra (IN); Raja Thirumalaiswamy, Maharashtra (IN); Shilpa Shirish Deshpande, Maharashtra (IN)

(73) Assignee: Council of Scientific and Industrial Research, New Delhi (IN)

( * ) Notice: Subject to any disclaimer, the term of this patent is extended or adjusted under 35 U.S.C. 154(b) by 366 days.

(21) Appl. No.: 13/390,309

(22) PCT Filed: Aug. 13, 2010

(86) PCT No.: PCT/IN2010/000538
§ 371 (c)(1),
(2), (4) Date: May 10, 2012

(87) PCT Pub. No.: WO2011/018802
PCT Pub. Date: Feb. 17, 2011

(65) Prior Publication Data
US 2012/0215017 A1 Aug. 23, 2012

(30) Foreign Application Priority Data
Aug. 13, 2009 (IN) .......................... 1690/DEL/2009

(51) Int. Cl.
*C07C 51/377* (2006.01)
*C11C 1/06* (2006.01)
*C11C 1/04* (2006.01)

(52) U.S. Cl.
CPC .... *C11C 1/06* (2013.01); *C11C 1/04* (2013.01)
USPC .................................................. 554/160

(58) Field of Classification Search
CPC ................ C11C 1/06; C11C 1/04; C11C 1/02
See application file for complete search history.

(56) References Cited

U.S. PATENT DOCUMENTS

| | | | | |
|---|---|---|---|---|
| 2,042,411 A * | 5/1936 | Peirce | .......................... | 554/154 |
| 2,065,145 A * | 12/1936 | Moore et al. | .................. | 554/160 |
| 2,156,863 A * | 5/1939 | Mills | .............................. | 554/160 |
| 2,458,170 A * | 1/1949 | Ittner | ............................ | 554/160 |
| 2,495,071 A | 1/1950 | Mills | | |
| 6,646,146 B1 * | 11/2003 | Sinnema et al. | .............. | 554/160 |
| 2007/0167642 A1 | 7/2007 | Oku et al. | | |

FOREIGN PATENT DOCUMENTS

| | | |
|---|---|---|
| CN | 1168366 A | 12/1997 |
| EP | 1 078 910 A1 | 2/2001 |
| EP | 1 733 788 A1 | 12/2006 |
| GB | 2 146 638 A | 4/1985 |
| WO | WO 03/087027 A1 * | 10/2003 ............. C07C 51/09 |
| WO | 2008/063322 A1 | 5/2008 |

OTHER PUBLICATIONS

International Search Report dated Nov. 18, 2010 for Application No. PCT/IN2010/000538.
XP-002608605, Database WPI Week 200167, Thomson Scientific, London, 2001-590411.

* cited by examiner

*Primary Examiner* — Yate K Cutliff
(74) *Attorney, Agent, or Firm* — Ladas & Parry LLP

(57) ABSTRACT

An effective process for producing fatty acids catalyzed by double metal cyanide complex or a supported group VIb transition metal oxide, wherein the catalyst is stable and reusable.

10 Claims, No Drawings

PROCESS FOR PRODUCING FATTY ACIDS

FIELD OF THE INVENTION

The present invention relates to a process for producing fatty acids in high purity and selectivity.

Present invention further relates to a process for producing fatty acids comprising hydrolysis of fatty acid glycerides of vegetable or natural oil and animal fat origin with water in the presence of a solid acid catalyst

BACKGROUND OF THE INVENTION

Fatty acids, in particular, those containing $C_6$-$C_{24}$ carbon atoms, are major components and precursors for a large variety of products such as soaps, detergents, fatty alcohols, cosmetics, pharmaceuticals, foods, lubricants, plasticizers etc. They can be used as a single component or a mixture of well-defined fatty acids. The main sources of their production are vegetable or natural oils and animal fats. Currently, fatty acids are mainly produced from the reaction of vegetable oils and/or animal fats with superheated steam at high temperatures and pressures (An Ullmann's Encyclopedia, Industrial Organic Chemicals: Starting Materials and Intermediates, Wiley-VCH, Weinheim, Germany, Vol. 4, Year 1999, pp. 2481-2532).

In the Colgate-Emery process, most widely employed, the reaction is conducted in a continuous, counter flow mode, in the absence of a catalyst, at a temperature of 250-330° C. and a pressure of 49-80 Kg/cm$^2$ (H. L. Barnebey, The Journal of the American Oil Chemists' Society, Year 1948, pp. 95-99). This process is efficient and vegetable oil/fat splitting yields of 98% and above are obtained. However, its applicability to all kinds of vegetable oils and animal fats especially those containing conjugated double bonds and hydroxyl substituents in their fatty acid back bone (ca., castor oil, fish oil etc) is limited. At high temperatures, the damage of fatty acids resulting from oxidation, decomposition, dehydration, polymerization and polycondensation are the usual undesired side reactions. Their propensity increases exponentially with temperature. The by-products formed lead to deterioration in color and odour and to a reduced yield of distillate fatty acid (Russell L. Holliday, Jerry W. King, Gary R. List, Ind. Eng. Chem. Res. Year 1997, Vol. 36, pp. 932-935).

The Twitchell fat splitting process is a batch reaction process. It is not in much use at present. It operates at moderate temperatures (ca. 100° C.) and atmospheric pressure employing a homogeneous catalyst. Twitchell reagent comprises of hydrocarbons, oleic acid and concentrated sulphuric acid. This process needs longer contact times (12-24 hrs) than the Colgate-Emery process and fat splitting is 80-85% only (L. Hartman, The Journal of the American Oil Chemists' Society, Year 1953, pp. 349-350).

Fatty splitting via saponification is one of the oldest methods in practice. U.S. Pat. Nos. 6,646,146 B1 and 5,383,678 disclose such processes performed in the presence of a metal or alkaline earth metal catalyst. This process produces metal soaps. In order to convert it to fatty acids, the product needs to be acidified, which in turn results in significant amount of inorganic waste and hard water. The quality of glycerine by-product is low. Additional process steps are essential to convert this glycerol into pharmaceutical grade glycerine.

Enzymatic splitting of fat is a low energy process (35° C.) but requires long contact times (16 hrs to several days) (U.S. Pat. No. 6,933,139 B2; Warner M. Linfield, Dennis J. O'Brien, Samuel Serota and Robert A. Barauskas, JAOCS, Year 1984, Vol. 61, pp. 1067-1071). U.S. Pat. No. 6,258,575 B1 discloses a process employing immobilized enzymes as catalysts. While complete hydrolysis can be achieved, leaching of enzyme into the reaction mixture and long term stability of the catalyst are the common issues.

References may be made to US patent application 2006/0047131 A1 reports a process to split free fatty acids from glycerol by hydrolysis at 60° C. and atmospheric pressure, under down-flow condition, in a packed column reactor containing calcium and magnesium oxide stones.

Recently, biodiesel is produced from fatty acids. While biodiesel is conventionally manufactured via transesterification of vegetable oils with alcohols, this method, however, is only applicable to refine vegetable oils/fats or those with a low content of free fatty acids and water. In the case of high content of fatty acids and/or water, as found in crude oils/fats, waste-frying oil, and soap stocks, the yield of methyl esters (bio-diesel) is low since fatty acids and water inhibit the reaction. Therefore, a two-step preparation of bio-diesel fuel was introduced wherein in the first step the feed stock is hydrolyzed at sub-critical conditions to free fatty acids and in the second step fatty acids, thus, produced, are esterified with an alcohol at supercritical conditions to form fatty acid alkyl esters (biodiesel) (Dadan Kusdiana and Shiro Saka, Appl. Biochem. Biotech. Year 2004, Vol. 113-116, pp. 781).

References may be made to patent WO 2003087027 relates to a liquid phase process for hydrolyzing a fatty acid ester to its corresponding fatty acid at a temperature of between 200-350° C., more preferably 250-280° C. and at a pressure of between 2-100 bar, preferably 10-70 bar; wherein the method comprises the steps of contacting fatty acid ester (in the liquid phase) with water (molar ratio of the amount of water with respect to the amount of fatty acid ester is at least 1) in the presence of an acid catalyst selected from the group of zeolites, ion exchange resins and acid amorphous catalysts. The process is carried out as a continuous process or a batch process. In this process, in order to achieve reasonably high fatty acid yields the process needs to be operated above 250° C., at which temperatures oils containing conjugated double bonds and hydroxyl groups (e.g., castor oil, fish oil etc.) get damaged and form undesired products. Further, the examples included are for the hydrolysis of short chain fatty acid methyl esters, namely C8-C12, yielding maximum of 70% in a batch process as exemplified in example 1-5 and 7-9. Also, this application does not cite examples for fatty acid glycerides and long chain esters.

References may be made to U.S. Pat. No. 6,646,146, wherein liquid phase process for the direct hydrolysis of a fatty acid ester (6-20 carbon atoms) to the corresponding fatty acid and alcohol in the presence of a catalyst which is an oxide, alkoxide, hydroxide or a salt of an organic acid of a metal selected from Li, Zn, Sn, Al, Ba, Ca, Mg, Ti, and Zr, capable of forming a soap with a large hydration shell_at a temperature preferably 180-230° C.; and under pressure of 43.5-290 psi. The hydrolysis is carried out in the presence of 0.01 to 0.2 percent by weight of metal with respect to the weight of the ester, preferably 500-2000 ppm of metal has disclosed. Saponification and metal soaps formation would be an issue with this process.

References may be made to U.S. Pat. No. 2,458,170, wherein inventor claims the method of hydrolysing fats and fatty oils with water to fatty acids and glycerine, with the aid of heat and pressure, which comprises intimately contacting such fatty material with water by counter current flow, whereby the fatty material undergoes substantial hydrolysis with the formation of fatty acids and glycerine. The hydrolysis is carried in absence of catalyst whereby substantially complete aqueous hydrolysis of fats and fatty oils is achieved without catalyst contamination. At lower temperatures and pressures, longer periods are required for the reaction to reach an equilibrium point, and at equilibrium the hydrolysis is considerably less.

Hydrolysis of vegetable oils/fats is an endothermic reaction. The extent of hydrolysis increases with an increase in temperature. Further at higher temperatures, miscibility of water in lipid increases and thereby enhances the reaction rate. However, the major drawbacks of the high temperature process as stated above are: It is an energy intensive and costly process. It uses considerable amount of superheated steam as a reagent. It requires the use of large reactors made of expensive corrosive-resistant material. The quality of crude product is poor and requires additional process step to purify the products fatty acids and glycerol that escalate the cost of the overall manufacturing process.

References may be made to Journal "Ind. Eng. Chem. Res. Vol. 48, Year 2009, pp. 4757-4767", wherein Ngaosuwan et al have reported the application solid acid catalysts—tungstated zirconia and Nation resin nanoparticles supported on mesoporous silica (SAC-13) for the hydrolysis of a model system tricaprylin. The reaction was conducted at atmospheric pressure and 110-150° C. in a semi batch reactor with continuous addition of water at low flow rates. This process suffers from major drawbacks such as catalyst has to be calcined before recycling and this process does not give over 90% conversions, especially in longer chains. Further, another drawback of this acid catalyst system is its deactivation in recycling studies.

In view of the above, it is desirable to have an efficient, economically beneficial, eco-friendly, catalytic, hydrolysis process of vegetable oils which operates at moderate temperatures and produces high purity free fatty acids and glycerine.

It would also definitely be advantageous to have a catalyst system that is easily recoverable and reusable and avoids formation of saponified compounds. The catalyst should also have features such that it is not leachable. The prior art catalysts suffer from a distinct disadvantage of inverse temperature-time relationship, where the temperature when raised to over 250 deg C. results in quicker processes, but is still energy intensive and also is unsuitable for the hydrolysis of temperature sensitive materials. Fatty acids with reactive groups (conjugated double bonds and hydroxyl groups such as those present in fish oil, castor oil etc.) are unstable at higher temperatures and will form undesirable tar products. The yield of by-product glycerol will also be lower at higher temperatures.

Another disadvantage of the prior art catalyst systems is that these are more hydrophilic; therefore do not facilitate adsorption of fatty oil molecules which can enhance rate of reaction at even lower temperatures.

OBJECTIVES OF THE INVENTION

Main objective of the present invention to provide a process for the preparation of fatty acids in presence of efficient, reusable, solid acid catalyst, under moderate reaction conditions, which is simple and industrially scalable.

Another object of the present invention is to produce free fatty acids and glycerol having greater than 98% purity and selectivity.

Yet another object of the present invention is to provide a flexible process wherein all kinds and types of vegetable or natural oil and animal fat including temperature sensitive castor oil and fish oil can be used as a feedstock.

Yet another object of the present invention is to provide a process that is conducted either in a batch, semi-batch and continuous fixed, packed bed reactor.

Still another object of the present invention is to provide a process that produces fatty acids with the trans isomer being below 5%.

SUMMARY OF THE INVENTION

Accordingly, present invention provides a process for producing fatty acids comprising contacting fatty acid glycerides of vegetable or natural oil or animal fat with water in presence of solid acid catalyst, characterized in that the solid acid catalyst is selected from double metal cyanide complex or a supported group VIb transition metal oxide and the said process comprising the steps of (a) contacting one or more fatty acid glycerides of vegetable or natural oil and animal fat origin with water in the presence of a solid acid catalyst wherein the oil/fat to water molar ratio is in the range of 1:5 to 1:40 and catalyst in the range of 3-10 wt % of oil/fat;

(b) subjecting the reaction mixture as obtained in step (a) at temperature in the range of 150 to 230° C. and pressure in the range of 1 to 6 M Pa to obtain fatty acid;

(c) separating fatty acids as obtained in step (b) from the reaction mixture and by-product glycerol.

In an embodiment of the present invention, the double metal cyanide complex has the chemical formula

$$Zn_3M_2(CN)_n(ROH).xZnCl_2.yH_2O$$

wherein R is tertiary-butyl;

M is a transition metal ion selected from the group consisting of Fe, Co and Cr;

x varies from 0 to 0.5, y varies from 3-5 and n is 10 or 12.

In another embodiment of the present invention, the group VIb transition metal oxide is molybdenum oxide or tungsten oxide and supported on silica or alumina and mixtures thereof or on supports containing said metal oxides or supports containing these oxides along with group VA promoter such as phosphorous.

In yet another embodiment of the present invention, the solid catalyst is stable, reusable and used in powder form or in a shaped form preferably as extrudates or sphere.

In an embodiment of the present invention, the vegetable or natural oil is edible or non-edible oil or mixtures thereof.

In still another embodiment of the present invention, the vegetable oil and animal fat is selected from the group consisting of coconut oil, sunflower oil, soybean oil, mustered oil, olive oil, cotton seed oil, groundnut oil, rapeseed oil, margarine oil, jojoba oil, Jatropha oil, castor oil, rice bran oil, fish oil, mixtures thereof and chicken fat and rendered fat.

In yet another embodiment of the present invention, the amount of trans-isomer in the product is less than 5%.

In yet another embodiment of the present invention, the purity of fatty acids and glycerine is at least 98%.

DETAILED DESCRIPTION OF THE INVENTION

The present invention provides a process for producing fatty acids comprising contacting fatty acid glycerides of vegetable or natural oil or animal fat with water in presence of efficient, reusable, solid acid catalyst selected from double metal cyanide complex or a supported group VIb transition metal oxide under moderate reaction conditions to obtain fatty acids and glycerol with 98% purity and selectivity.

Process of the present invention for producing fatty acids characterized in that the process comprises of:

a. contacting one or more fatty acid glycerides of vegetable or natural oil or animal fat origin with water in the presence of a solid acid catalyst selected from double metal cyanide complex or a supported group VIb transition metal oxide;
b. subjecting the reaction mixture of step (a) to a temperature in the range of about 150 to 230° C. and pressure in the range of about 1-6 M Pa; and
c. separating fatty acids formed from the reaction mixture and by-product glycerol.

The double metal cyanide complex of the present invention used for the hydrolysis of fatty glycerides has the chemical formula:

$$Zn_3M_2(CN)_n(ROH).xZnCl_2.yH_2O$$

where, R is tertiary-butyl, M is a transition metal ion selected from the group of Fe, Co and Cr, x varies from 0 to 0.5, y varies from 3-5 and n is 10 or 12. The double metal cyanide has the physicochemical characteristics as below:

| Textural Characteristics: | |
|---|---|
| Total surface area ($S_{BET}$) | 38.4 m$^2$/g |
| External surface area ($S_{Exm.}$) | 24.1 m$^2$/g |
| Micropore area | 14.3 m$^2$/g |
| Average pore diameter | 3.9 nm |
| Total pore volume | 0.037 cc/g |
| Elemental analysis: | |
| % C-content | 23.3 |
| % H-content | 2.24 |
| % N-content | 17.3 |
| Morphology (SEM): | Spherical shaped particles |
| Spectral characteristics: | |
| FT-IR band positions (in cm$^{-1}$) | 2096 (v(C≡N)), 1230 (v(C—O)), 500 (v(Fe—C)) |
| Diffuse reflectance UV-visible bands (in nm) | 405, 330, 278, 236 and 208 |

The group VIb metal oxide is preferably molybdenum oxide or tungsten oxide and supported on silica or alumina and mixtures thereof or supports containing these metal oxides or supports containing these oxides along with group VA promoter such as phosphorous. The supported group VIb metal oxide catalyst has the physicochemical characteristics as below:

| | |
|---|---|
| Metal oxide content (wt %) | 5-30 |
| Group VA promoter (e.g., P) content (wt %) | 0-5 |
| Specific Surface Area (m$^2$/g) | 160-300 |
| Pore Volume (cc/g) | 0.4-1.5 |

Even though it is known from EP1733788 (US20070004599) {Claiming priority from Indian Application no. 1561/DEL/2005 dated 16 Jun. 2005}, and U.S. Pat. Nos. 7,754,643 and 7,482,480 which relate to an improved process for the preparation of lubricants and hydrocarbon fuels from vegetable oil or fat obtained from animal source, involving a reaction of vegetable oil or fat with an alcohol in the presence of a double metal cyanide catalyst, at a temperature in the range of 150° to 200° C. for a period of 3-6 hrs to obtain the desired products, application of said catalyst for the production of fatty acids by reaction with water instead of alcohols, is novel. Even though Lewis acids can catalyse hydrolysis and transesterification of fatty acid glycerides, not all solid acid catalysts can catalyse this reaction with equal efficiency with higher yields at temperature ranges as low as 150-230 deg C. DMC being hydrophobic is able to perform the task of esterification and hydrolysis at lower temperatures and improved yields as well as lower quantities of undesired trans-isomer products for all oils including fish and castor oils as exemplified herein.

The vegetable or natural oil is an edible or non-edible oil, alone or in combinations thereof selected from the group comprising, but not limited to coconut oil, sunflower oil, soybean oil, mustard oil, olive oil, cotton seed oil, rapeseed oil, margarine oil, jojoba oil, jatropha oil, castor oil, rice bran oil, fish oil, algae oil and like oils and mixtures thereof. The animal fat is chicken fat or rendered fat, alone or in combinations thereof.

The oil/fat to water molar ratio is in the range of 1:5 to 1:40 and the amount of the catalyst taken is 3-10 wt % of oil/fat. The reaction is carried out in a batch or semi-batch reactor or in a continuous fixed bed reactor. The solid catalysts of the invention are stable and reusable.

Reaction is carried out at moderate conditions and with minimum process steps. Accordingly, in a preferred feature of the invention, the process is carried out at a temperature in the range of 150-230° C. and at a pressure of 10-60 bar (1-6 M Pa).

It is a feature of the process of present invention that the catalyst is a solid and the reaction takes place in a heterogeneous condition, the product fatty acid and glycerin is a liquid and the solid catalyst can be easily separated from products by centrifugation/filtration for further reuse.

In yet another feature, the conversion of triglycerides in oil or fat is greater than or equal to 90% and the fatty acid and glycerol selectivity is at least 98%. Further, the purity of fatty acid and glycerine produced by the process is at least 98%, with the amount of trans-isomer in the product less than 5%. The fatty acids produced by the instant process are a composition of fatty acids with $C_6$-$C_{24}$ carbon atoms.

In still yet another feature, the reaction is conducted without using any solvent.

In the investigations leading to the present invention, it is found that the solid acid catalysts selected from the group comprising of double metal cyanide complexes or supported group VIb transition metal oxides convert vegetable or natural oil or animal fat to fatty acids that can be easily separated from the products for further reuse, thus overcoming the shortcoming of the processes of the prior art using metal and lipase catalysts wherein there is a need for additional resources for catalyst removal from the product stream. An easily separable catalyst system of the present invention is beneficial and leads to an economic and eco-friendly process. Hence, the solid catalysts of the present invention are not only efficient but avoid the tedious process of catalyst recovery characteristic of the prior art processes. The present catalyst system is efficient without using any additional solvent. The catalyst of the present invention enables operation of the process at moderate conditions and thereby provides economic benefits and produce high purity fatty acids and glycerol for direct applications in food and pharmaceutical industry.

EXAMPLES

The present invention is illustrated herein below with examples, which are illustrative only and should not be construed to limit the scope of the present invention in any manner.

Example 1

This example illustrates the preparation of Fe—Zn double metal cyanide catalyst used in the present invention. K$_4$[Fe (CN)$_6$] (0.01 mol) was dissolved in double distilled water (40 ml) (Solution-1). ZnCl$_2$ (0.1 mol) was dissolved in a mixture of distilled water (100 ml) and tertiary-butanol (20 ml) (Solution)-2. Poly(ethylene glycol)-block-poly(propylene glycol)-block-poly(ethylene glycol) (EO$_{20}$—PO$_{70}$-EO$_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over, a period of 5 min and stirring was continued for further 1 h. The solid cake formed was filtered, washed with distilled water (500 ml) and dried at 25° C. for 2-3 days. This material was activated at 180-200° C. for 4 h prior to using it in the reactions.

Example 2

This example illustrates the preparation of Fe—Co double metal cyanide catalyst used in the present invention. K$_4$[Co(CN)$_6$] (0.01 mol) was dissolved in double distilled water (40 ml) (Solution-1). ZnCl$_2$ (0.1 mol) was dissolved in a mixture of distilled water (100 ml) and tertiary-butanol (20 ml) (Solution-2). Poly(ethylene glycol)-block-poly(propylene glycol)-block-poly(ethylene glycol) (EO$_{20}$—PO$_{70}$-EO$_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid formed was filtered, washed with distilled water (500 ml) and dried at 25° C. This material was activated at 180-200° C. for 4 h prior to using it in the reactions.

Example 3

This example illustrates the preparation of Fe—Cr double metal cyanide catalyst used in the present invention. K$_3$[Cr(CN)$_6$] (0.01 mol) was dissolved in double distilled water (40 ml) (Solution-1). ZnCl$_2$ (0.1 mol) was dissolved in a mixture of distilled water (100 ml) and tertiary-butanol (20 ml) (Solution-2). Poly(ethylene glycol)-block-poly(propylene glycol)-block-poly(ethylene glycol) (EO$_{20}$—PO$_{70}$-EO$_{20}$; molecular weight of about 5800) (15 g) was separately dissolved in 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid formed was filtered, washed with distilled water (500 ml) and dried at 25° C. This material was activated at 180-200° C. for 4 h prior to using it in the reactions.

Example 4

This example illustrates the preparation of fatty acids from soy bean oil in a batch reactor over Fe—Zn double metal cyanide catalyst. 50 g of soybean oil, water (with a oil to water molar ratio of 1:40) and catalyst (10 wt % of oil) were charged into a 300 ml Ti-lined Paar autoclave. The reaction was conducted at 210° C. and autogeneous pressure (2 M Pa) for 8 h while stirring the contents of the reactor at a speed of 500 rpm. The autoclave was then allowed to cool to 25° C. First, the catalyst was separated by centrifugation/filtration from the reaction mixture. The product contained two layers—oil layer at top and water layer at the bottom. The oil phase contained fatty acids and unreacted oil if any, and the water phase contained water and by-product glycerol. The two phases were separated by gravity. Any water present in the oil phase was distilled off. It was then subjected to high performance liquid chromatographic (HPLC) analysis and acid value was estimated.

Glycerol from the bottom layer was separated by distilling out water. Mass balance was found to be 100%. Purity of glycerol as determined by gas chromatographic (GC) analysis was found to be 100%. Trans-isomer of fatty acid was found to be 2%. To facilitate the separation of oil and water layers in the reaction product mixture, a small amount of petroleum ether or hexane can be added. Perkin-Elmer Series 200 HPLC fitted with a reverse-phase, C-18 Spheri-5 column (250×4.6 mm with a 5 µm particle size) and ELSD detector (Gilson) was used for the HPLC analysis. An injection volume of 10 µL, flow rate of 1 ml/min, column temperature of 50° C. and mobile phase of methanol and 2-propanol/n-hexane (5 to 4 v/v) were employed. A Varian GC instrument (injector at 250° C. and detector at 260° C.) equipped with a Varian Select for FAME column (30 m×0.32 mm ID×0.25 µm film thickness) was employed for the analysis of glycerol by GC method.

Example 5

This example illustrates the preparation of fatty acids from soy bean oil in a continuous fixed bed reactor over formulated Fe—Zn double metal cyanide catalyst. Fe—Zn double metal cyanide was formulated with alumina as binder (complex: binder weight ratio=80:20) and extruded (1/24") by known procedures. In a typical reaction, the catalyst was packed in a stainless tube reactor tube. Reagents—soybean oil and water (molar ratio 1:15) were fed to the reactor using a dual pumping system. The flow rate of feed with respect to vegetable oil was maintained at 0.4 h$^{-1}$, the temperature of the reactor was maintained at 210° C. and pressure at 3 M Pa. The reaction was conducted in an upward flow and the product mixture was collected from the top of the reactor. Fatty acids were separated from glycerol and water and analysed as described in Example 4. Mass balance was found to be 100%. Purity of glycerol as determined by gas chromatographic analysis was found to be 100%. The trans-isomer of fatty acids was found 4%. Time-on stream studies were carried out for several hours and no deactivation of catalyst was detected.

Example 6

This example illustrates the preparation of fatty acids in a batch reaction from soy bean oil over Fe—Zn double metal cyanide catalyst. 10 g of soybean oil, water (with oil to water molar ratio of 1:30) and catalyst (5 wt % of oil; in the form of powder or extruded spheres) were charged into a 100 ml stainless steel autoclave having a Teflon-liner. The autoclave was closed and placed in a rotating synthesis reactor (Hiro Co., Japan, Mode-KH 02; rotating speed=50 rpm) and, the reaction was conducted at 190° C. and autogeneous pressure (1 M Pa) for 12 h. It was then allowed to cool to 25° C. First, the catalyst was separated by centrifugation/filtration from the reaction mixture. Fatty acids were separated from glycerol and water and analyzed as described in Example 4. Mass balance was found to be 100%. Purity of glycerol as determined by gas chromatographic analysis was found to be 100%. The trans-isomer of fatty acids was found to be <2%.

Example 7

This example illustrates the preparation of fatty acids from castor oil in a batch reaction over Fe—Zn double metal cyanide catalyst. 10 g of castor oil, water (with oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure for 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids was found to be <2%.

Example 8

This example illustrates the preparation of fatty acids from non-edible karanja oil in a batch reaction over Fe—Zn double metal cyanide catalyst. 10 g of karanja oil, water (with oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at autogeneous pressure at 190° C. for 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids in the product was found to be <2%.

Example 9

This example illustrates the preparation of fatty acids from non-edible jatropha oil in a static batch reaction over Fe—Zn double metal cyanide catalyst. 10 g of jatropha oil, water (with oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogenous pressure for 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be is 100%. The trans-isomer of fatty acids in the product was found to be 2%.

Example 10

This example illustrates the preparation of fatty acids from palm oil in a batch reaction over Fe—Zn double metal cyanide catalyst. 10 g of palm oil, water (with oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure for 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids in the product was found to be 1%.

Example 11

This example illustrates the preparation of fatty acids from waste cooking oil in a batch reaction over Fe—Zn double metal cyanide catalyst. 10 g of waste cooking oil, (Mixture of different vegetable oils including soybean, groundnut, margarine oils.) water (with a oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure foBarr 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids in the product was found to be 4%.

Example 12

This example illustrates the preparation of fatty acids from chicken fat in a batch reaction over Fe—Zn double metal cyanide catalyst. 10 g of chicken fat, water (with oil to water molar ratio of 1:30) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure for 12 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids was found to be less than 1%.

Example 13

This example illustrates the preparation of fatty acids over molybdenum oxide supported on alumina catalyst. In a typical process, 10 g of soybean oil, water (with a oil to water molar ratio of 1:20) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure for 8 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids in the product was found to be <2%.

Example 14

This example illustrates the preparation of fatty acids in a batch reaction over Fe—Zn double metal cyanide catalyst with oil to water molar ratio of 1:5. 10 g of soybean oil, water and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at autogeneous pressure at 190° C. for 8 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids in the product was found to be <2%.

Example 15

This example illustrates the preparation of fatty acids in a continuous fixed bed reactor over molybdenum oxide (a group VIB metal oxide) supported on 2% phosphorous (a group VA promoter) containing alumina catalyst. The catalyst as extudates (1/24") were packed in a stainless tube reactor tube placed. Reagent feeds of soybean oil and water were fed to the reactor using two different pumps. Soybean oil to water molar ratio was maintained at 1:15. The flow rate of feed with respect to vegetable oil was 0.4 $h^{-1}$. Temperature of the reactor was maintained at 230° C. and the pressure at 5.5 M Pa. The reaction was conducted in an upward flow and the product mixture was collected from the top of the reactor. Fatty acids were separated from glycerol and water and analysed as described in Example 4. Mass balance was found to be 100%. Purity of glycerol as determined by gas chromatographic analysis was found to be 100%. The trans-isomer of fatty acids in the product was found to be 3%. Time-on stream studies were carried out for several hours and no deactivation of catalyst was detected.

Example 16

This example illustrates the preparation of fatty acids in a batch reaction over Fe—Zn double metal cyanide catalyst. In this reaction, about 20% by weight of the product of Example 6 was added 80% of fresh soy bean oil and used as oil feed. This admixture enabled enhanced miscibility of water in oil phase and reduced reaction time considerably and enabled higher yields of fatty acids. In a typical process, 10 g of oil mixture (20% product of Example 4+80% fresh soybean oil), water (with oil to water molar ratio of 1:20) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure (1 M Pa) for 5 h. It was then allowed to cool to 25° C. First, the catalyst was separated by centrifugation/filtration from the reaction mixture. Fatty acids were separated from glycerol and water and analyzed as described in Example 4. Mass balance was found to be 100%. Purity of glycerol as determined by gas chromatographic analysis was found to be 100%. The trans-isomer of fatty acids was found to be 2%.

Example 17

This example illustrates the preparation of fatty acids in a batch reaction over Fe—Zn double metal cyanide catalyst with soybean oil to water molar ratio of 1:20 and the reusability of the catalyst. 10 g of soybean oil, water and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at autogeneous pressure at 190° C. for 8 h. It was then allowed to cool to 25° C. First, the catalyst was separated by centrifugation/filtration from the reaction mixture. Fatty acids and by-product glycerol were separated and analyzed as described in Example 4. The results of subjecting the catalyst to 5 cycles and the results of conversion and selectivity towards fatty acids are tabulated herein. The separated catalyst was reused in subsequent recycles without subjecting it to any further treatments of purification/surface cleaning. The reused catalysts have the same structural and spectroscopic characteristics as those of the fresh catalyst. (Table 1)

Example 18

This example illustrates the preparation of fatty acids from soybean oil in a batch reaction over Co—Zn double metal cyanide catalyst. 10 g of soybean oil, water (with oil to water molar ratio of 1:20) and catalyst (5 wt % of oil) were charged into a 100 ml stainless steel autoclave having a Teflon-liner. The autoclave was closed and placed in a rotating synthesis reactor (Hiro Co., Japan, Mode-KH 02; rotating speed=50 rpm) and the reaction was conducted at 190° C. and autogeneous pressure for 8 h. It was then allowed to cool to 25° C. First, the catalyst was separated by centrifugation/filtration from the reaction mixture. Fatty acids and by-product glycerol were separated and analyzed as described in Example 4. Mass balance was found to be 100%. Purity of glycerol as determined by gas chromatographic analysis was found to be 100%. The trans-isomer of fatty acids was found to be <2%.

TABLE 1

Results of recyclability study of Fe—Zn DMC catalyst

| No of recycles | Conversion (wt %) | % Selectivity of fatty acid |
|---|---|---|
| 0 (fresh) | 93.9 | 71.8 |
| $1^{st}$ | 96.5 | 70.8 |
| $2^{nd}$ | 97.1 | 72.8 |
| $3^{rd}$ | 96.2 | 71.2 |
| $4^{th}$ | 97.1 | 72.9 |
| $5^{th}$ | 97.9 | 72.8 |

TABLE 2

Results of catalytic activity studies exemplified in EXAMPLES 4-16 and Example 18

| Example | TG conversion (%) | FFA yield (%) |
|---|---|---|
| 4 | 99.9 | 94.0 |
| 5 | 95.0 | 77.0 |
| 6 | 98.5 | 77.2 |
| 7 | 99.0 | 51.9 |
| 8 | 99.9 | 76.7 |
| 9 | 99.3 | 82.7 |
| 10 | 99.2 | 80.2 |
| 11 | 99.2 | 83.2 |
| 12 | 97.2 | 78.5 |
| 13 | 56.2 | 60.1 |
| 14 | 92.7 | 49.4 |
| 15 | 98 | 85.0 |
| 16 | 99.5 | 75.0 |
| 18 | 96.7 | 67.5 |

Many modifications, substitutions and variations of the present invention are possible and apparent to those skilled in the art. The present invention can be practised other than specifically described in the examples and should be limited in scope and breadth only by the appended claims.

ADVANTAGES OF THE INVENTION

Advantages of instant invention are as following:
1. Low temperature process
2. Alcohol free process
3. Negligible amounts of trans-isomers of fatty acids formed
4. High purity levels of products formed
5. High mass balance of 100% obtained
6. Applicable to a large number of oils, fats and combinations

We claim:

1. A process for producing fatty acids comprising contacting a fatty acid glycerides of vegetable or natural oil or animal fat with water in presence of solid acid catalyst, characterized in that the solid acid catalyst is selected from double metal cyanide complex or a supported group VIb transition metal oxide and the said process comprising the steps of:
   a. contacting one or more fatty acid glycerides of vegetable or natural oil and animal fat origin with water in the presence of a solid acid catalyst wherein the oil/fat to water molar ratio is in the range of 1:5 to 1:40 and catalyst in the range of 3-10 wt % of oil/fat;
   b. subjecting the reaction mixture as obtained in step (a) at temperature in the range of 150 to 230° C. and pressure in the range of 1 to 6 M Pa to obtain fatty acid;
   c. separating fatty acids as obtained in step (b) from the reaction mixture and by-product glycerol.

2. The process as claimed in claim 1, wherein the double metal cyanide complex used has the chemical formula:

$$Zn_3M_2(CN)_n(ROH) \cdot xZnCl_2 \cdot yH_2O$$

wherein R is tertiary-butyl;
M is a transition metal ion selected from the group consisting of Fe, Co and Cr;
x varies from 0 to 0.5, y varies from 3-5 and n is 10 or 12.

3. The process as claimed in claim 1, wherein the group VIb transition metal oxide used is molybdenum oxide or tungsten oxide and supported on silica or alumina and mixtures thereof or on supports containing said metal oxides or supports containing these oxides along with group VA promoter such as phosphorous.

4. The process as claimed in claim 1, wherein the solid catalyst used is stable, reusable and used in powder form or in a shaped form.

5. The process as claimed in claim 1, wherein the vegetable or natural oil used is edible or non-edible oil or mixtures thereof.

6. The process as claimed in claim 1, wherein the vegetable oil used is selected from the group consisting of coconut oil, sunflower oil, soybean oil, mustered oil, olive oil, cotton seed oil, groundnut oil, rapeseed oil, margarine oil, jojoba oil, Jatropha oil, castor oil, rice bran oil, fish oil, mixtures thereof.

7. The process as claimed in claim 1, wherein animal fat is selected from chicken fat and rendered fat.

8. The process as claimed in claim 1, wherein the amount of trans-isomer in the product is less than 5%.

9. The process as claimed in claim 1, wherein the purity of fatty acids and glycerine is at least 98%.

10. The process as claimed in claim 4, wherein the shaped form is an extrudate or sphere.

* * * * *